(12) United States Patent
Muehlebach

(10) Patent No.: US 10,344,485 B2
(45) Date of Patent: Jul. 9, 2019

(54) CORK FLOOR WITH CLICK CONNECTION

(71) Applicant: Proverum AG, Baar (CH)

(72) Inventor: Moritz Muehlebach, Dietlikon (CH)

(73) Assignee: PROVERUM AG, Baar (CH)

(*) Notice: Subject to any disclaimer, the term of this patent is extended or adjusted under 35 U.S.C. 154(b) by 0 days.

(21) Appl. No.: 15/205,990

(22) Filed: Jul. 8, 2016

(65) Prior Publication Data

US 2017/0009462 A1    Jan. 12, 2017

(30) Foreign Application Priority Data

Jul. 10, 2015  (CH) .................................. 1004/2015

(51) Int. Cl.
*E04F 15/10* (2006.01)
*E04F 15/02* (2006.01)
(Continued)

(52) U.S. Cl.
CPC .............. *E04F 15/107* (2013.01); *B32B 7/04* (2013.01); *B32B 9/02* (2013.01); *B32B 27/304* (2013.01); *E04F 15/02* (2013.01); *E04F 15/02038* (2013.01); *E04F 15/105* (2013.01); *E04F 15/181* (2013.01); *E04F 15/206* (2013.01); *B32B 2317/02* (2013.01); *B32B 2471/00* (2013.01); *E04F 2201/0138* (2013.01); *E04F 2201/0153* (2013.01);
(Continued)

(58) Field of Classification Search
CPC ....... E04F 15/107; E04F 15/02; E04F 15/105; E04F 15/181; E04F 15/206; E04F 15/02038; E04F 2201/023; E04F 2201/0161; E04F 2201/043; E04F 2201/0138; E04F 2201/0153; B32B 27/304; B32B 9/02; B32B 7/04; B32B 2317/02; B32B 2471/00

See application file for complete search history.

(56) References Cited

U.S. PATENT DOCUMENTS 6,212,838 B1  4/2001  Eda
2009/0155612 A1* 6/2009 Pervan ................. B32B 21/02
                                                    428/498
(Continued)

FOREIGN PATENT DOCUMENTS

CH    159884 A    4/1933
DE    10201087 A1  7/2002
(Continued)

OTHER PUBLICATIONS

American National Standard Medium Density Fiberboard (MDF) for interior Applications Feb. 2, 2009 (Year: 2009).*

*Primary Examiner* — Patrick J Maestri
(74) *Attorney, Agent, or Firm* — Birch, Stewart, Kolasch & Birch, LLP

(57) ABSTRACT

A floor element comprises a supportive layer, a reinforcement layer adjacent to the supportive layer, a top layer, and an outer layer. The arrangement has the supportive layer and the reinforcement layer between the top layer and the outer layer, and the floor element has, at its periphery, connection means for connection to another floor element. The supportive layer and the outer layer are composed of a cork material and at least the supportive layer and the reinforcement layer extend into the connection means.

16 Claims, 4 Drawing Sheets

(51) Int. Cl.
*E04F 15/18* (2006.01)
*E04F 15/20* (2006.01)
*B32B 7/04* (2019.01)
*B32B 9/02* (2006.01)
*B32B 27/30* (2006.01)

(52) U.S. Cl.
CPC . *E04F 2201/0161* (2013.01); *E04F 2201/023* (2013.01); *E04F 2201/043* (2013.01)

(56) References Cited

U.S. PATENT DOCUMENTS

| 2013/0047536 A1* | 2/2013 | Pervan | B26D 1/14 52/309.1 |
| 2013/0104485 A1* | 5/2013 | Meersseman | B27N 7/00 52/578 |

FOREIGN PATENT DOCUMENTS

| DE | 102007054516 A1 | 5/2009 |
| DE | 202011107236 U1 | 11/2011 |
| DE | 10 2013 101 798 A1 | 5/2014 |
| DE | 10 2012 112 562 A1 | 6/2014 |
| WO | WO 2014/017939 A1 | 1/2014 |
| WO | WO 2014/116131 A1 | 7/2014 |

* cited by examiner

CORK FLOOR WITH CLICK CONNECTION

TECHNICAL FIELD

The invention relates to a floor element with a supportive layer, a reinforcement layer adjacent to the supportive layer, a top layer, and an outer layer, where the arrangement has the supportive layer and the reinforcement layer between the top layer and the outer layer, and wherein the floor element has, at its periphery, connection means for connection to another floor element.

PRIOR ART

There are various known floorcoverings which can be constructed from floor elements that can be connected mechanically to one another. The elements are often panels which comprise a rectangular area and which have, along their periphery, i.e. at their periphery, connection means for connection to the adjacent panels.

An example of a floorcovering of this type is laminate. A laminate floor element is composed of a supportive board, generally made of a (wood-)fiber material which has a top layer applied to its upper side. The top layer generally comprises a decorative layer, for example a decorative paper, and also a protective layer, e.g. a lacquer layer. There can be a counterbalancing layer applied to the underside of the supportive board. Said counterbalancing layer provides mechanical stabilization of the floor element and serves as moisture barrier. The arrangement can moreover have solid-borne-sound insulation arranged on the underside; (this can, however, also be laid separately, before the installation of the actual laminate floor).

A laminate floor is generally composed of a plurality of rows of rectangular floor elements. The floor elements generally firstly have continuous, groove-like connection elements on one longer side and one shorter side, and secondly have continuous, tongue-like connection elements on the other longer side and the other shorter side. The geometries of the groove-like and the tongue-like connection elements are adapted appropriately for one another in a manner that can provide an interlocking connection between the floor elements, where the top layer of the connected elements forms a continuous service area. The arrangement usually has elements of adjacent rows offset with respect to one another, in order to form a floor area that is stable and aesthetically attractive.

Nowadays, the connection elements often take the form of what is known as a click system. The grooves and tongues comprise mechanical elements which lock into one another during installation of the floor. This improves the mechanical stability of the floor and prevents formation of obvious joints between the floor elements secured to one another. The floorcovering is laid without fixing to the substrate, and dimensional changes caused by expansion or shrinkage (e.g. resulting from changes in temperature and/or humidity) are adsorbed via peripheral gaps at the walls.

There are various known click systems which have different geometry and permit use of different procedures during installation. More detail of this is provided at a later stage below.

Nowadays there are also floors similar to laminates but made of other materials and composed of floor elements that can be connected mechanically to one another and can be laid without attachment to the substrate, examples being click parquet, solid PVC floors ("Luxury Vinyl Tile", LVT), and cork coverings. The latter are similar to laminates in that they generally comprise a supportive board made of a fiber material, e.g. HDF.

There is moreover a floorcovering available known as "hydrocork" which comprises a core made of cork which has been highly compacted and is therefore very hard, with thickness by way of example 3 mm, enclosed by two PVC layers with thickness in each case by way of example 1.2 mm.

WO 2014/116131 A1 (Amorim Revestimentos) describes a floorcovering of that type, and discloses a laminated floor panel made of a cork-based material with a middle layer made of cork-based material; said layer has a wear layer on one of its large surfaces, and has the connection means at its periphery. The arrangement has an outer layer, e.g. made of PVC, on the large surface opposite to the wear layer.

By virtue of the core made of cork, it is possible to reduce the plastics content of the floorcovering in comparison with conventional LVT floorcoverings that can be laid without attachment to the substrate.

The middle layer made of cork-based material has to be very dense and, with this, comparatively hard. Because the PVC content remains comparatively high, and the cork layer has high density, the properties of the covering are rather like those of a conventional LVT covering, and the advantageous properties of an actual cork covering, namely good solid-borne-sound insulation, user comfort, and warmth for the feet, are substantially absent.

DE 10 2012 112 562 (Guido Schulte) similarly discloses a floor element which comprises a supportive board with an upper-side coating, e.g. a wear layer based on melamine resin, polyurethane (PU), polyethylene terephthalate (PET), polypropylene (PP) and/or polyvinyl chloride (PVC). The supportive board is composed of a cork material and, at its periphery, has profiling and click-connection means. The click-connection means (groove and, respectively, tongue) is therefore part of the supportive board. The cork material of the supportive board is in particular highly compacted cork granulate with density more than 580 kg/m$^3$, preferably between 600 and 900 kg/m$^3$. The upper-side coating of the supportive board comprises a decorative layer, by way of example printed directly by means of digital printing onto the supportive board; this visible side can moreover have an embossed surface structure appropriate to the printed decorative image. There can be a counterbalancing layer provided on the underside of the supportive board; said layer can likewise be composed of highly compacted cork granulate.

In order to permit formation of the click-connection means in the supportive board, the cork has to be greatly compacted, and has to comprise admixed binders. The situation is similar to that when "hydrocork" is used: vital properties of a cork layer are lost.

DESCRIPTION OF THE INVENTION

It is an object of the invention to provide a floor element within the technical field mentioned in the introduction which exhibits good solid-borne-sound insulation, provides good user comfort, and has advantageous thermal properties.

Achievement of the object is defined via the features of claim 1. The supportive layer and the outer layer in the invention are composed of a cork material, and at least the supportive layer and the reinforcement layer extend into the connection means.

The meaning of extension of the reinforcement layer into the connection means is that said layer extends into a floor-element region which projects and which is below the top layer. The nature of the connection geometry can render it unnecessary that the reinforcement layer extends into said region in both mutually opposite sides of the floor element—there is also a geometry which excludes existence of this type of region in both peripheral regions that interact with one another in the floor elements.

The connection geometry at the longitudinal peripheries can differ from that at the perpendicular peripheries, as described in more detail at a later stage below.

The reinforcement layer provides, to the supportive layer and, with this, also to the connection means, mechanical stability, in particular in relation to tensile and compressive loads in the main plane of the supportive layer. It is therefore possible, even when using a comparatively soft cork material for the supportive layer, to provide a connection geometry permitting stable connection of adjacent floor elements. The comparatively soft cork material provides the desired properties to the floor, i.e. good solid-borne-sound insulation, the high level of user comfort, and pleasant warmth for the feet.

The reinforcement layer moreover at the same time represents a counterbalancing layer. It is therefore in particular possible to omit a further counterbalancing layer.

A floor element of the invention can moreover be produced practically entirely from natural raw materials; there is no need for the PVC layers of the known composite cork coverings that can be laid without attachment to the substrate.

Another possible feature of a floor element of the invention is in particular that it comprises in essence no formaldehyde. In many floor elements, formaldehyde is used in the HDF which serves as supportive board. An element of the invention preferably uses no HDF, and formaldehyde can be omitted in the cork layers of the invention, and it is therefore possible to produce a floor element of the invention without formaldehyde.

Furthermore, said element can in particular also in essence comprise no phthalates. Phthalates are usually used as plasticizers in PVC layers in floorcoverings. Phthalates can amount to up to 50% of the total weight of the PVC here. Binders are another conventional application for phthalates. There is no chemical bonding between phthalates and the PVC polymers or the binder constituents, and they can therefore be evolved in gaseous form over the course of time, and/or can dissolve in water, and/or can attach themselves to house dust.

Surprisingly, it has been found that the cork material of the invention also exhibits its advantageous properties when used with phthalate-free binders. The cork layers of the invention therefore preferably comprise no phthalates; it is particularly preferable that the floor elements of the invention comprise no phthalates.

The omission of phthalates and/or formaldehyde is advantageous because both formaldehyde and phthalates are suspected of causing health problems. Both substances are volatile and can be evolved in gaseous form, and omission of both substances is therefore in particular advantageous for a floor element for use in residential spaces and in workrooms.

The design of a floor element of the invention can be such that its ability to absorb water is very small. This is in particular achieved by using binders which have very low water absorption, and by adding conventional additives. The cork particles themselves naturally exhibit hydrophobic properties. Surprisingly, it has been found that use of binders with low water absorption rate and addition of additives which reduce water absorption have almost no effect on the other properties of the cork layers, with the result that they continue to be suitable for floor elements of the invention. Floor elements with low water absorption are suitable in particular for use in a damp environment, for example in bathrooms.

In another preferred embodiment, antibacterial additions are admixed with the cork layers. Suitable additions are marketed by way of example with trademark "Microban®". Again, these additions do not substantially change the mechanical properties of the cork layers. Antibacterial properties can prolong the lifetime of the floor elements, e.g. in damp and warm usage sectors.

Antibacterial additions and additions for low water absorption can be used together or independently of one another. Furthermore, the addition(s) can be combined with phthalate-free binders and/or with formaldehyde-free constituents.

The reinforcement layer is advantageously composed of a nonwoven made of a fiber material, in particular glassfiber material. This type of material allows provision of a layer with high strength together with low weight and low thickness. The supportive layer provided with the glassfiber nonwoven layer combines the advantageous properties of cork with high strength, in particular in the regions of the connection means.

It is also possible to use a woven fabric instead of a nonwoven. Materials that can be used are not only glassfibers but also other fiber materials, e.g. synthetic materials such as aramids. Alternatively, it is possible to use other materials for the reinforcement layer, examples being high-strength wood-based materials.

It is preferable that the arrangement has a first reinforcement layer adjacent to the supportive layer and between the supportive layer and the outer layer. The reinforcement layer therefore reinforces the supportive layer on the reverse side thereof, i.e. on the side facing away from the user surface.

It is usual here that a counterbalancing layer is also introduced, and it is therefore preferably possible that said reinforcement layer assumes the counterbalancing-layer function.

In particular, the first reinforcement layer also extends into the connection means. The selection of the geometry of the connection means is therefore such that it is formed to a significant extent via that region of the layer build-up that comprises the supportive layer (or a section thereof) and that comprises the first reinforcement layer.

In addition or alternatively, there is a second reinforcement layer present, arranged adjacent to the supportive layer and between the supportive layer and the top layer, or in particular a second supportive layer. It reinforces the supportive layer on the frontal side thereof, i.e. on the side facing toward the user surface.

The second supportive layer is preferably a cork layer with density greater than the density of the supportive layer.

In particular, the second reinforcement layer also extends into the connection means. The selection of the geometry of the connection means is therefore such that it is formed to a significant extent via that region of the layer build-up that comprises the supportive layer (or a section thereof) and that comprises the second reinforcement layer.

If two reinforcement layers are present, it is possible that both of these extend into the connection means, or that only one of these does so. It can be appropriate for the connection geometry that the first reinforcement layer extends into first connection means, while the second reinforcement layer extends into second connection means.

In a preferred embodiment of the invention, the supportive layer and the top layer are adjacent. This top layer is in particular composed mainly of PVC, and comprises a decorative layer.

A floorcovering of this type combines the advantageous properties of an actual cork covering, namely good solid-borne-sound insulation, user comfort, and warmth for the feet, with the robustness, optical properties, and design possibilities provided by a PVC floor.

In this embodiment, the top layer is composed in particular of a first PVC layer, preferably of thickness from 0.5 to 1.5 mm. The thickness of this layer is in particular about 1 mm. It is preferable that, covering one side of this layer, there is a decorative paper or a print. This print and this decorative paper are possible embodiments of a decorative layer. The decorative layer is in turn adjacent to a second PVC layer, the thickness of which is preferably from 0.2 to 0.8 mm. in particular from 0.3 to 0.5 mm. The thickness of this second PVC layer is determined inter alia via the desired wear lifetime.

In this embodiment with the PVC top layer, there is no essential need for a second reinforcement layer and a second supportive layer, because the PVC top layer, in particular the first PVC layer, assumes the functions of a balancing layer and of provision of a decorable surface. However, it is entirely possible that a top layer described above made of PVC, or else only the first or the second PVC layer, is combined with a second reinforcement layer and/or with a second supportive layer.

In a preferred embodiment of the invention, the second supportive layer is composed of a cork material. The result is a floorcovering which is substantially composed of cork and which can be laid without attachment to the substrate. This type of floorcovering is very substantially composed of a natural raw material, and has excellent mechanical and thermal properties.

It is advantageous that the density of the second supportive layer and the density of the outer layer are higher than the density of the supportive layer. In particular, the density of the supportive layer is at least 20% lower, preferably at least 30% lower, than the density not only of the second supportive layer but also of the outer layer. In contrast to the prior art, in which the supportive layer, which also forms the connection geometry, must be particularly hard, a comparatively soft layer is used here in order in particular to obtain good solid-borne-sound insulation and a high level of user comfort.

It is preferable that the density of the supportive layer is at most 500 kg/m$^3$, in particular at most 400 kg/m$^3$.

It is preferable that the second supportive layer and the outer layer are respectively composed of a pressed cork granulate, where the grain size of the cork granulate of the second supportive layer is finer than the grain size of the cork granulate of the outer layer.

It is preferable that at least 70% of the mass of the cork material of which at least one of the layers of the floor element is composed is composed of natural cork. This at least one layer is in particular the supportive layer and/or the outer layer and/or the second supportive layer. In another embodiment, at least 70% of the mass of all of the cork materials of the floor element is composed of natural cork.

High cork content of the floor element ensures that the favorable properties of the cork are particularly significant, examples being a high level of damping, low thermal conductivity, hydrophobic properties, and conservation of resources during production and disposal.

In contrast, a smaller cork content, for example 50% of the mass of the floor element or of all of the cork materials of the floor element or of the cork material of a layer, can provide greater design freedom and allow adaptation to very specific conditions, for example high local area loadings.

In a preferred embodiment, the second supportive layer has, on its outer side, print and/or structuring. The print is in particular achieved via a digital printing process; the structuring can be achieved via embossing or via a material-ablating process.

In a preferred embodiment, the top layer has, on its outer side, print and/or structuring. The print is in particular achieved via a digital printing process; the structuring can be achieved via embossing or via a material-ablating process.

In a preferred embodiment, the top layer covers a printed and/or structured layer. The print is in particular achieved via a digital printing process; the structuring can be achieved via embossing or via a material-ablating process.

The printing can take place directly onto the supportive layer, with subsequent application, onto the print, of a transparent protective layer, which forms the top layer of the floorcovering. However, it is also possible that there is an additional layer present above the supportive layer which is printed. It is thus possible to produce cork floors with a very wide variety of aesthetics: the cover layer can by way of example imitate a wood surface, a natural stone surface, or a tiled surface. The expression "cover layer" is preferably a collective term for all of the layers above the supportive layer, i.e. by way of example a second reinforcement layer, a second supportive layer, and a top layer, or simply a top layer with or without decorative layers.

It is therefore possible to use other materials alongside a second supportive layer made of cork. By way of example, it is possible to apply a print or a decorative paper to the supportive layer or the second supportive layer, with subsequent application of a wear layer based on melamine resin, polyurethane (PU), polyethylene terephthalate (PET), polypropylene (PP) and/or polyvinyl chloride (PVC).

It is preferable that the floor element has, at least along the longer sides, connection means to produce a click-lock connection. This in particular means a connection in which a floor element is firstly longitudinally clicked at an angle into a previously laid floor element, and is then tilted into the horizontal position, this being a simple method of providing a reliable mechanical connection. Corresponding geometries are known, by way of example from the laminate sector.

The floor element advantageously has, alongside the geometry mentioned at the longer sides, connection means along the shorter sides which permit vertical insertion of adjacent floor elements. This means that a floor element can be inserted vertically downward along the shorter side into a previously laid floor element. On insertion it is possible, by virtue of the elasticity of the connection regions that interact with one another, a degree of interlocking in vertical direction occurs, or that the connection merely provides secure retention in relation to tension in the horizontal direction. In the second case, secure retention in the vertical direction is ensured via the connection geometry along the longer sides.

This type of geometry along the shorter sides facilitates laying of the floorcovering of the invention, because each floor element next to be attached along the longer sides can be interlocked directly, before the other floor elements in the same series have been attached.

Alternatively, it is also possible that there are connection means along the shorter sides which provide a click-lock connection when the floor elements are first attached at an angle and then are tilted downward. The result is what is known as "angle/angle" laying of the floorcovering.

Other advantageous embodiments and feature combinations of the invention will be apparent from the following detailed description and the entirety of the patent claims.

BRIEF DESCRIPTION OF THE DRAWINGS

The drawings used to explain the embodiment show the following.

Identical parts in principle have the same reference signs in the figures.

METHODS FOR THE IMPLEMENTATION OF THE INVENTION

Figure 1:
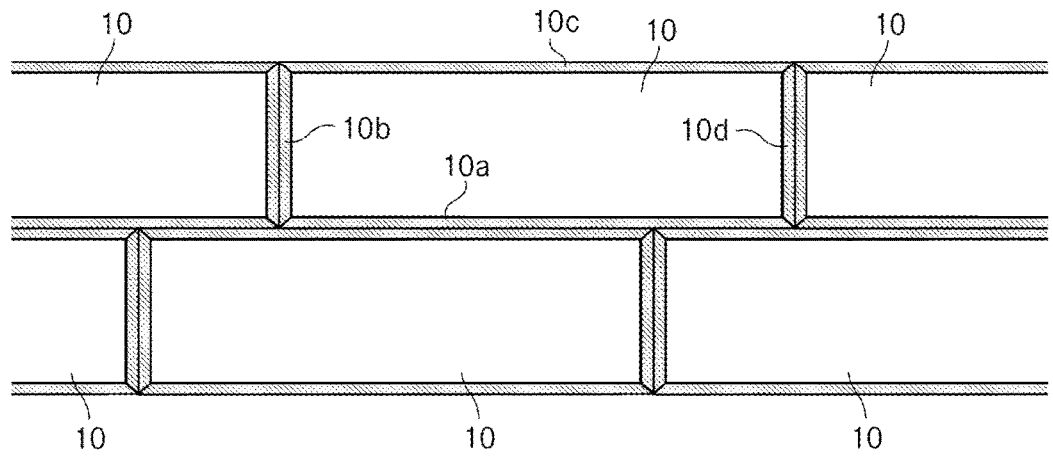
FIG. 1 a section of a floor produced with a first embodiment of the floor elements of the invention.

FIG. 1 shows a section from a floor produced with a first embodiment of the floor elements of the invention. A plurality of rectangular floor elements 10 are connected to one another at their longer sides 10a, 10c and at their shorter sides 10b, 10d, thus forming a planar floorcovering which can in theory have any desired dimension. A connection geometry is provided along the longer sides 10a, 10c and shorter sides 10b, 10d.

In the first embodiment, the connection geometry in the longitudinal direction, i.e. between the shorter sides 10b, 10d of adjacent floor elements 10, is identical with that in transverse direction, i.e. between the longer sides 10a, 10c of adjacent floor elements 10. The geometry along the longer sides 10a in each case depicted below in FIG. 1 in the floor elements 10, and also along the shorter sides 10d in each case depicted on the right-hand side in FIG. 1, is groove-like (cf. below, FIG. 6A, left-hand side). The geometry along the longer sides 10c in each case depicted above in FIG. 1 in the floor elements 10, and also along the shorter sides 10b in each case depicted on the left-hand side in FIG. 1, is tongue-like (cf. below, FIG. 6A, right-hand side).

Figure 4A:
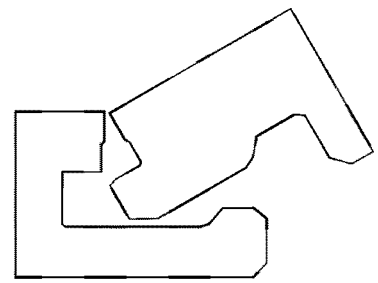
FIG. 4A,B production of a click connection for the securing of second floor elements of the first or second embodiment.
Figure 4B:
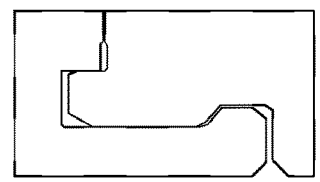

The floor elements are laid in a manner known per se which, with reference to FIG. 1, proceeds from left to right and downward, and as can be seen in FIGS. 4A, 4B the tongue of the floor element that is next to be laid is first inserted at an angle into the groove of the previously laid floor element (FIG. 4A), and is subsequently locked by tilting, thus giving the final position of FIG. 4B.

Figure 2:
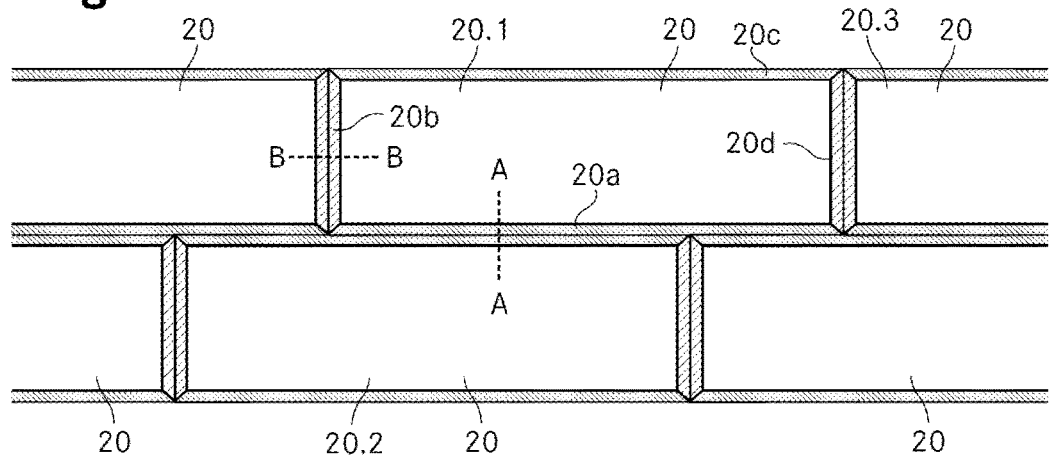
FIG. 2 a section from a floor produced with a second embodiment of the floor elements of the invention.

FIG. 2 shows a section from a floor produced with a second embodiment of the floor elements of the invention.

A plurality of rectangular floor elements 20 are connected to one another at their longer sides 20a, 20c and at their shorter sides 20b, 20d, thus forming a planar floorcovering which can in theory have any desired dimension. A connection geometry is provided along the longer sides 20a, 20c and shorter sides 20b, 20d.

In the second embodiment, the connection geometry in longitudinal direction, i.e. between the shorter sides 20b, 20d of adjacent floor elements 20, differs from the connection geometry in transverse direction, i.e. between the longer sides 20a, 20c of adjacent floor elements 10. A groove-like geometry, analogous to the geometry of floor elements of the first embodiment (cf. below, FIG. 6A, left-hand side), is again provided along the longer sides 20a in each case depicted below in FIG. 2 in the floor elements 20. The corresponding tongue-like geometry is provided (cf. below, FIG. 6A, right-hand side) along the longer sides 20c interacting therewith in the floor elements 20.

Along the shorter sides 20d in each case depicted on the right-hand side in FIG. 2, a connection geometry with an upward-extended recess is provided for a vertical connection (cf. below, FIG. 6B, left-hand side); along the shorter sides 20b in each case depicted on the left-hand side, a connection geometry with a downward-extended recess is provided for a vertical connection (cf. below, FIG. 6B, right-hand side).

Figure 5A:
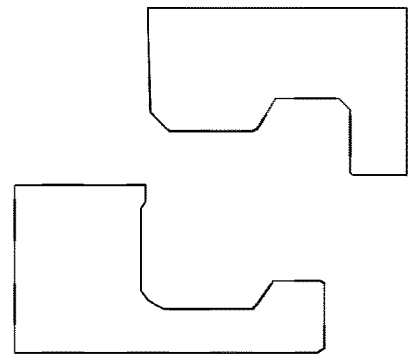
FIG. 5A,B production of a vertical connection for the securing of two floor elements of the second or third embodiment.
Figure 5B:
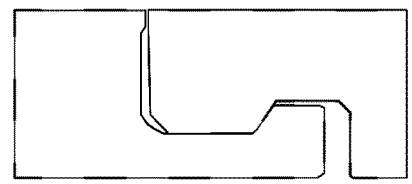

The manner of laying of the floor elements again proceeds, with reference to FIG. 2, from left to right and downward, and floor elements 20 here which are adjacent in the longitudinal direction can be inserted from above into the grooves of the previously laid floor elements 20, cf. FIGS. 5A, 5B. Tilting occurs only when the connection is made along the longer sides 20a, 20c. This simplifies the connection of further floor elements 20 in the longitudinal direction, because this remains possible when laying and locking of the preceding floor elements has already been completed.

Figure 3:
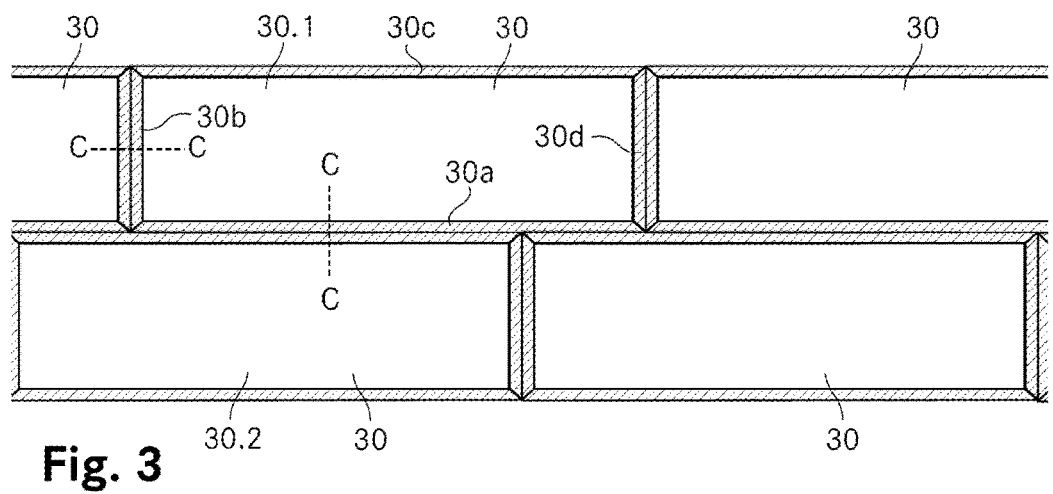
FIG. 3 a section from a floor produced with a third embodiment of the floor elements of the invention.

FIG. 3 shows a section from a floor produced with a third embodiment of the floor elements of the invention.

A plurality of rectangular floor elements 30 are connected to one another at their longer sides 30a, 30c and at their shorter sides 30b, 30d, thus forming a planar floorcovering which can in theory have any desired dimension. A connection geometry is provided along the longer sides 30a, 30c and shorter sides 30b, 30d.

In the third embodiment, a geometry for vertical connection is provided not only in the longitudinal direction, i.e. between the shorter sides 30b, 30d of adjacent floor elements 30 but also in transverse direction, i.e. between the longer sides 30a, 30c of adjacent floor elements 30, with snap-fit insertion and resultant locking in vertical direction by virtue of the elasticity of the mutually interacting elements. The geometry with upward-extended recess is provided along the longer sides 30a in each case depicted below in FIG. 3 in the floor elements 30, and also along the shorter sides 30d in each case depicted on the right-hand side in FIG. 3 (cf. FIG. 7, left-hand side); the geometry with downward-extended recess is correspondingly provided along the longer sides 30c in each case depicted above in FIG. 3, and also along the shorter sides 30b in each case depicted on the left-hand side in FIG. 3 (cf. FIG. 7, right-hand side).

The manner of laying of the floor elements is again, with reference to FIG. 3, from left to right and downward, and the adjacent floor elements 30 here can in each case be inserted from above into the grooves of the previously laid floor elements 30, the connection here being achieved by exerting pressure, for example with the aid of a hammer, thus temporarily overcoming the elastic recovery force arising in the connection regions.

Figure 6A:
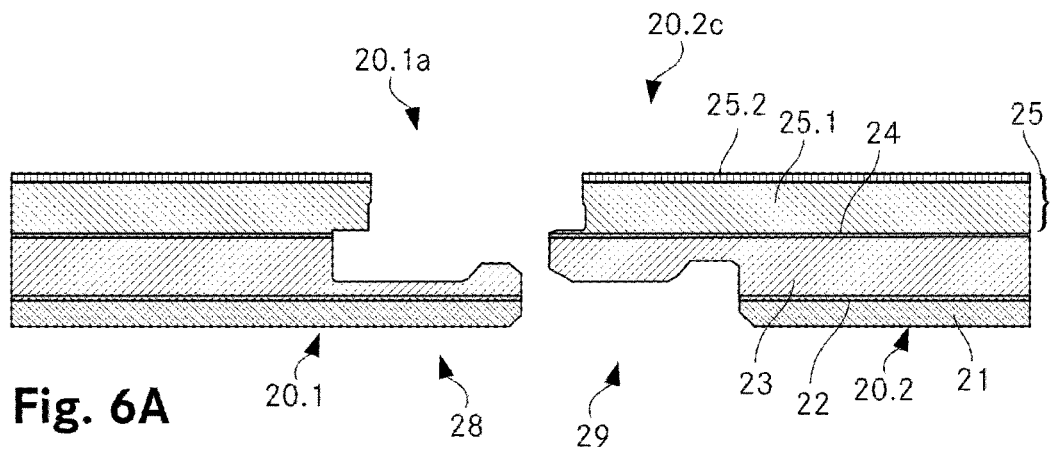
FIG. 6A,B layer build-up and connection geometry of a floor element of the second embodiment.
Figure 6B:
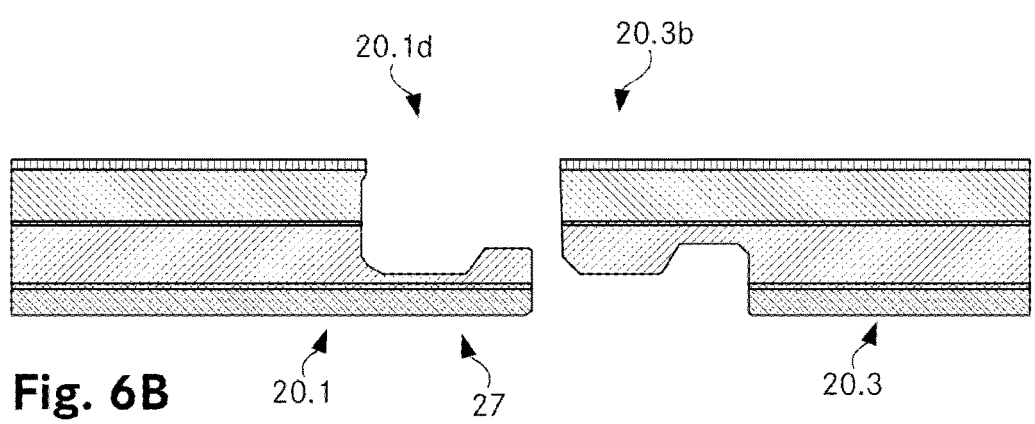

FIGS. 6A, 6B show the layer build-up and the connection geometry of a floor element of the second embodiment. FIG. 6A shows a cross section along the line A-A in FIG. 2B, i.e. the connection region in the region of a longer side of the floor element. FIG. 6B shows a cross section along the line B-B in FIG. 2B, i.e. the connection region in the region of a shorter side of the floor element.

The connection region of the floor element of the first embodiment (cf. FIG. 1A) corresponds, both along the longer side and along the shorter side, to the geometry shown in FIG. 6A.

FIG. 6A shows one of the longer sides 20.1a of a first floor element 20.1 and the other longer side 20.2c of a second floor element 20.2 prior to the connection. The longer side 20.1a of the first floor element 20.1 has a groove-like connection geometry; the longer side 20.2c of the second floor element 20.2 has a tongue-like connection geometry. The floor elements 20.1, 20.2 have the same layer build-up throughout. The undermost layer, an outer layer 21, is composed of a cork material of high density. Adjoining the upper side of this there is a first reinforcement layer 22 made of a glassfiber nonwoven. Above the nonwoven the arrangement has the supportive layer 23 made of a cork material with density lower than that of the outer layer 21, and above this there is then another reinforcement layer 24. This is covered by the cover layer 25, firstly another cork layer with relatively high density, which is what may be termed a 2nd supportive layer 25.1, and finally a top layer 25.2, e.g. made of a suitable lacquer. An adhesive known per se has been used to adhesively-bond and laminate layers 21-25 to one another.

The groove-like connection region 28 along the longer side 20.1a is that portion of the floor element 20.1 that projects beyond the service area composed of the top layer 25.2. The outer layer 21, the first reinforcement layer 22, and also a portion of the supportive layer 23 extend into said portion. A mechanically stable connection region 28 is obtained by virtue of the reinforcement layer 22, the glassfiber nonwoven laminated to the supportive layer 23.

The groove-like connection region 29 along the longer side 20.2c is that portion of the floor element 20.2 that projects beyond the service area composed of the top layer 25.2. A small portion of the 2nd supportive layer 25.1 of the cover layer 25, the second reinforcement layer 24, and also a portion of the supportive layer 23 extend into said portion. Hereagain, a mechanically stable connection region 29 is obtained by virtue of the second reinforcement layer 24, the glassfiber nonwoven laminated to the supportive layer 23. The floor elements 20.1, 20.2 are joined as shown in FIGS. 4A, 4B.

FIG. 6B shows one shorter side 20.1d of the first floor element 20.1 and the other shorter side 20.3b of a third floor element 20.3 prior to connection. The shorter side 20.1d of the first floor element 20.1 has a connection geometry with a recess on the top layer side; the shorter side 20.3b of the third floor element 20.3 has a recess on the underside (outer-layer side). In accordance with the above definition, according to which a connection region projects and is below the top layer 25.2, a connection region 27 is formed only in the case of the recess on the top layer side. The outer layer 21, the first reinforcement layer 22, and also a portion of the supportive layer 23 extend into said region.

In the case of the opposite floor element 20.3, the second reinforcement layer 24 extends over the underside recess as far as the edge of the floor element 20.3, and thus reinforces the tongue, which interacts with the recess on the top layer side of the other floor element 20.1.

Figure 7:
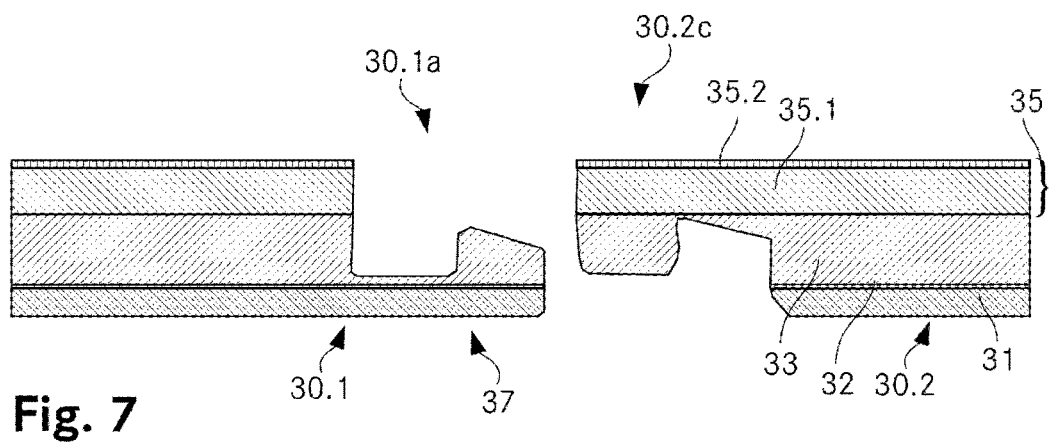
FIG. 7 layer build-up and connection geometry of a floor element of the third embodiment.

FIG. 7 shows the layer build-up and the connection geometry of a floor element of the third embodiment. This has, both along the longer sides and along the shorter sides, a connection geometry that permits connection of two adjacent floor elements via vertical insertion. In many respects, the geometry corresponds to that of FIG. 6B. In order to achieve secure vertical retention, however, the mutually interacting sections have a somewhat different shape.

FIG. 7 shows one of the longer sides 30.1a of a first floor element 30.1 and the other longer side 30.2c of a second floor element 30.2 prior to connection. The longer side 30.1a of the first floor element 30.1 has a connection geometry with a recess on the top layer side; the longer side 30.2c of the second floor element 30.2 has a recess on the underside (outer-layer side). The geometry between mutually interacting shorter sides is the same, and no separate depiction of this is required.

The floor elements 30.1, 30.2 have the same layer build-up throughout. The undermost layer, an outer layer 31, is composed of a cork material of high density. Adjacent to the upper side of this is a reinforcement layer 32 made of a glassfiber nonwoven. Above the nonwoven the arrangement has the supportive layer 33 made of a cork material of lower density than that of the outer layer 31. This is covered by the cover layer 35, being firstly a 2nd supportive layer 35.1 made of cork of relatively high density, and finally a top layer 35.2, for example made of a suitable lacquer. An adhesive known per se has been used to adhesively-bond and laminate layers 31-35 to one another. In accordance with the above definition, according to which a connection region projects and is below the top layer 25.2, a connection region 37 is formed only in the case of the recess on the top layer side. The outer layer 31, the first reinforcement layer 32, and also a portion of the supportive layer 33 extend into said region.

The groove-like, upward-directed recess of the connection region 37 of the first floor element 30.1 has a slight undercut. The same applies to the downward-directed tongue which interacts therewith in the second floor element 30.2. During vertical insertion, in particular the connection region 37 of the first floor element 30.1 is slightly deformed to permit full insertion of the tongue. Once the connection region 37 has sprung back to its initial shape, the tongue is securely vertically retained in the groove-like recess. Secure horizontal retention is obtained via interlock connection, by virtue of the geometry of the connection regions that interact with one another.

Figure 8A:
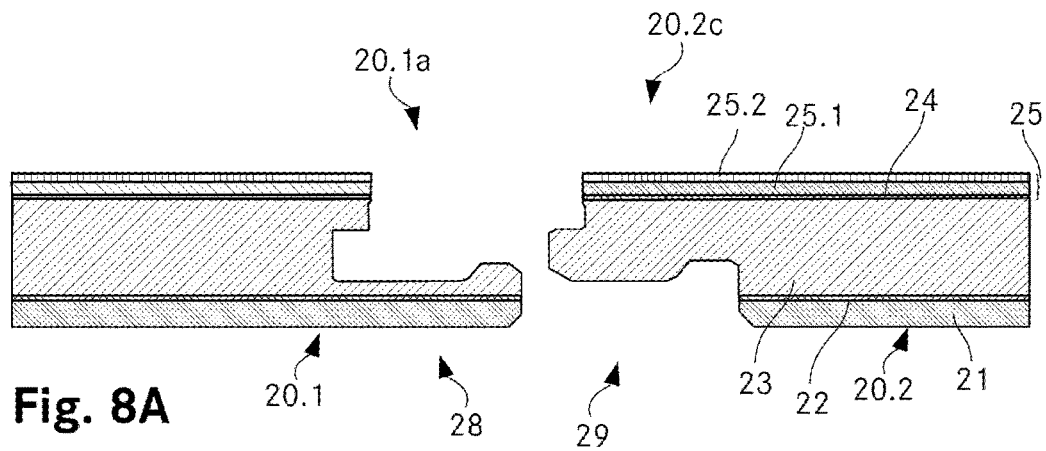
FIG. 8 A,B layer build-up and connection geometry of a floor element of the fourth embodiment.
Figure 8B:
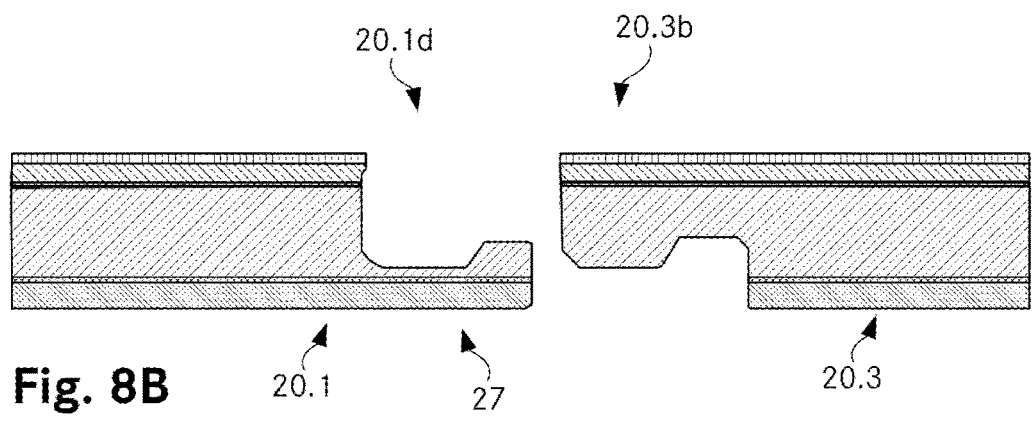

The connection geometry shown in FIGS. 8A and 8B is the same as that in FIGS. 6A and 6B, but the layer build-up of the floor element is different. As far as the arrangement and methods of laying are concerned, this embodiment does not therefore differ from the embodiment shown in FIGS. 6A and 6B.

The structure of the floor elements is however as follows: as in FIGS. 6A and 6B, there is an outer layer 21 and a first reinforcement layer 22 thereabove, which serves as counterbalancing layer and reinforcement. Again, the arrangement has a first supportive layer 23 thereabove. This is followed by a second reinforcement layer 24, a second supportive layer 25.1, and finally the top layer 25.2. The sequence and material, and the properties of the materials of the layers, are no different from those of the floor elements shown in FIGS. 6A and 6B. The difference lies in the thickness of individual layers: in FIGS. 8A and 8B, the distance of the first and the second reinforcement layer 22 and 24 from the element surface respectively closer to these is preferably approximately identical. The "surface respectively closer" here is the outer side of the outer layer 21 for the first reinforcement layer 22 and the outer side of the top layer 25.2 for the second reinforcement layer 24. The reinforcement layers 22 and 24 here serve as balancing layer and counterbalancing layer of the floor elements. They ensure that the various layers do not move out of position with respect to one another and thus cause distortion of the element. Their precise position in the element is therefore a function of the physical properties of the different layers. Because, by way of example, the top layer 25.2 can itself assume a partial balancing function, but the outer layer 21 could behave differently and could apply excessive or insufficient counterbalancing, it is preferable that the reinforcement layers 22 and 24 are placed suitably in order to compensate these differences.

The first reinforcement layer 22 must preferably extend into the connection means, preferably into the tongue-like connection means, in order to ensure that these have the required stability. In contrast, the second reinforcement layer 24 is preferably arranged without consideration of the connection means in such a way that it can operate as balancing layer in relation to the counterbalancing layer realized via the first reinforcement layer 22.

In the fourth embodiment outlined in FIGS. 8A and 8B, the second reinforcement layer 24 is therefore above the connection means.

Figure 9:
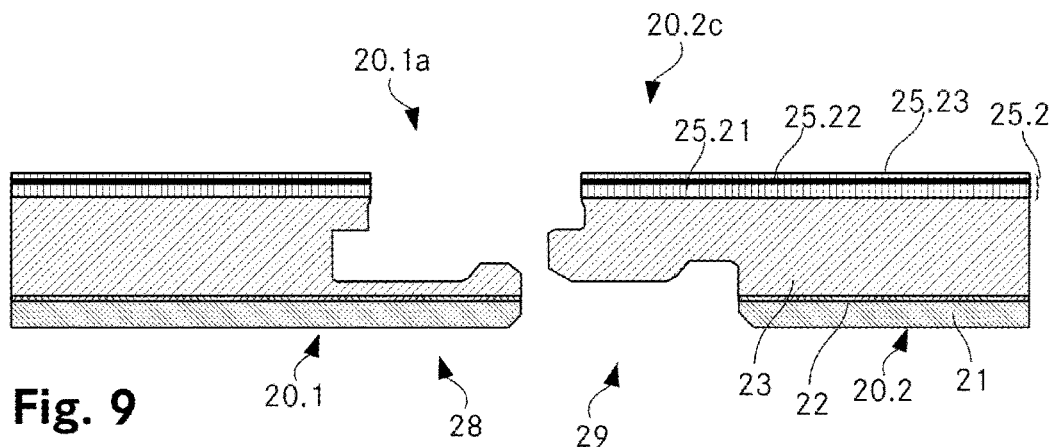
FIG. 9 layer build-up and connection geometry of a floor element of the fifth embodiment.

FIG. 9 shows another possible layer build-up of a floor element. The geometry of FIG. 6A has been adopted here by way of example, but the layer build-up can be used with any other connection geometry of the invention.

The floor element again has an outer layer 21, which is undermost. Above this is the first reinforcement layer 22, which performs two tasks: firstly acting as counterbalancing layer and secondly strengthening the tongue-like portion of the connection means. A supportive layer 23 follows, above the first reinforcement layer 22. The material of which outer layer 21, reinforcement layer 22, and supportive layer 23 are made is preferably the same as that in the preceding embodiments. Their thicknesses and positions are also similar. However, the sequence here has neither a second reinforcement layer nor a second supportive layer. Instead, there is a top layer 25.2 directly above the supportive layer. This wear-protection system 25.2 is preferably composed of three portions: a first PVC layer 25.21, preferably of thickness about 1 mm, a decorative layer 25.22, which by way of example can be a printed paper, or which is printed directly onto the PVC, and finally a second PVC layer 25.23, the thickness of which is preferably from 0.2 to 0.8 mm, particularly preferably from 0.3 to 0.5, and which forms the service area.

In this case the PVC top layer 25.2 forms an effective balancing layer, and there is therefore no requirement for a second reinforcement layer 22. The production is thus simplified. In particular, it is possible to prefabricate the entire PVC top layer 25.2.

The invention is not restricted to the embodiments depicted: it is also possible that in a variant with connection geometry as in the third embodiment there may be a second reinforcement layer above the supportive layer. The design of the cover layer can be entirely different: by way of example the supportive layer can have been printed on its upper surface, and the top layer can be composed of a wear layer made of transparent material. In the case of a specific variant, by way of example, the supportive layer has been printed by means of a digital printing process on its upper surface, and is covered by a transparent wear layer of thickness from 0.3 to 0.5 mm, made of PVC. It is also possible to use a mineral top layer or cover layer, e.g. a thin layer of natural stone. Many other variants are likewise realizable within the scope of the invention.

It is likewise possible to design the specific geometry of the connection regions differently. Suitable shapes are known per se from the parquet and laminate sector. Alongside the layers, it is possible that other elements, in particular interlocking elements, are present in a manner known per se and ensure the connection in the connection region.

In summary, it should be stated that the invention provides a floor element which exhibits good solid-borne-sound insulation, provides good user comfort, and has advantageous thermal properties.

The invention claimed is:

1. A floor element comprising:
a supportive layer,
a reinforcement layer adjacent to the supportive layer,
a top layer,
an outer layer, and
a connection means for connection to another floor element at a periphery of the floor element, wherein
the supportive layer and the reinforcement layer are between the top layer and the outer layer,
the supportive layer and the outer layer are composed of a cork material,
at least the supportive layer and the reinforcement layer extend into the connection means whereby a density of the supportive layer is at most 500 kg/m3,
the reinforcement layer is adjacent to both the supportive layer and the outer layer.

2. The floor element according to claim 1, rein the reinforcement layer is composed of a nonwoven made of a fiber material.

3. The floor element according to claim 1, further comprising
a second reinforcement layer which is adjacent to the supportive layer and between the supportive layer and the top layer.

4. The floor element according to claim 1, wherein the supportive layer is adjacent to the top layer.

5. The floor element according to claim 1, further comprising:
a second supportive layer composed of a cork material.

6. The floor element according to claim 5, wherein a density of the second supportive layer and a density of the outer layer are higher than a density of the supportive layer.

7. The floor element according to claim 5, wherein the second supportive layer and the outer layer are respectively composed of a pressed cork granulate, where the grain size of the cork granulate of the second supportive layer is finer than the grain size of the cork granulate of the outer layer.

8. The floor element according to claim 1, further comprising:
a second supportive layer having on its outer side, print and/or structures.

9. The floor element according to claim 1, wherein the connection means is at least along longer sides of the floor element, and produces a click-lock connection.

10. The floor element according to claim 9, wherein the connection means are along shorter sides of the floor element and permit vertical insertion of adjacent floor elements.

11. The floor element according to claim 1, wherein the reinforcement layer is composed of a glassfiber material.

12. The floor element according to claim 1, further comprising:
- a second reinforcement layer, and
- a second supportive layer, wherein
- a second reinforcement layer is adjacent to the supportive layer and between the supportive layer and the second supportive layer.

13. The floor element according to claim 1, wherein the supportive layer is adjacent to the top layer and the top layer is composed mainly of PVC.

14. The floor element according to claim 1, wherein the supportive layer is adjacent to the top layer and the top layer comprises a decorative layer.

15. The floor element according to claim 1, wherein the top layer has, on its outer side, print and/or structuring.

16. The floor element according to claim 1, wherein the top layer covers a printed and/or structured layer.

* * * * *